United States Patent
Dhandapani

(10) Patent No.: US 11,679,466 B2
(45) Date of Patent: Jun. 20, 2023

(54) FILTERING DURING IN-SITU MONITORING OF POLISHING

(71) Applicant: Applied Materials, Inc., Santa Clara, CA (US)

(72) Inventor: Sivakumar Dhandapani, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/886,386

(22) Filed: Aug. 11, 2022

(65) Prior Publication Data

US 2022/0388113 A1 Dec. 8, 2022

Related U.S. Application Data

(62) Division of application No. 16/294,382, filed on Mar. 6, 2019, now Pat. No. 11,446,783.

(60) Provisional application No. 62/641,950, filed on Mar. 12, 2018.

(51) Int. Cl.
*B24B 37/013* (2012.01)
*B24B 49/10* (2006.01)
*B24B 37/30* (2012.01)

(52) U.S. Cl.
CPC ............ *B24B 37/013* (2013.01); *B24B 49/10* (2013.01); *B24B 37/30* (2013.01); *G05B 2219/49085* (2013.01)

(58) Field of Classification Search
USPC ................................. 700/108–109, 121, 164
See application file for complete search history.

(56) References Cited

U.S. PATENT DOCUMENTS

| | | | |
|---|---|---|---|
| 5,069,002 | A | 12/1991 | Sandhu et al. |
| 5,865,665 | A | 2/1999 | Yueh |
| 6,464,824 | B1 | 10/2002 | Hofmann et al. |
| 9,308,618 | B2 | 4/2016 | Benvegnu |
| 2006/0246820 | A1 | 11/2006 | Hofmann |
| 2007/0042675 | A1 | 2/2007 | Benvegnu et al. |
| 2013/0288572 | A1 | 10/2013 | Benvegnu |

(Continued)

FOREIGN PATENT DOCUMENTS

| | | |
|---|---|---|
| EP | 0738561 | 1/2002 |
| JP | H10-058318 | 3/1998 |

(Continued)

OTHER PUBLICATIONS

International Search Report and Written Opinion in International Appln. No. PCT/US2019/021045, dated Jun. 17, 2019, 9 pages.

(Continued)

*Primary Examiner* — Sean Shechtman
(74) *Attorney, Agent, or Firm* — Fish & Richardson P.C.

(57) ABSTRACT

A method of controlling polishing includes polishing a substrate, monitoring the substrate during polishing with an in-situ monitoring system, filtering a signal from the monitoring system to generate a filtered signal, and determining at least one of a polishing endpoint or an adjustment for a polishing rate from the filtered signal. The filtering includes modelling a plurality of periodic disturbances at a plurality of different frequencies using a plurality of disturbance states, modelling an underlying signal using a plant state, and applying a linear prediction filter to the plant state and the plurality of disturbance states to generate a filtered signal representing the underlying signal.

21 Claims, 3 Drawing Sheets

(56) References Cited

U.S. PATENT DOCUMENTS

| | | |
|---|---|---|
| 2015/0125971 A1 | 5/2015 | Takahashi et al. |
| 2015/0147829 A1 | 5/2015 | Benvegnu et al. |
| 2015/0147940 A1 | 5/2015 | Benvegnu et al. |
| 2017/0113320 A1 | 4/2017 | David et al. |
| 2019/0275633 A1 | 9/2019 | Dhandapani |

FOREIGN PATENT DOCUMENTS

| | | |
|---|---|---|
| JP | 2000-218518 | 8/2000 |
| JP | 2001-198813 | 7/2001 |
| JP | 2007-281460 | 10/2007 |
| JP | 2015-519740 | 10/2013 |
| JP | 2015-085487 | 5/2015 |
| JP | 2016-538728 | 12/2016 |
| WO | WO 2015/080863 | 6/2015 |

OTHER PUBLICATIONS

Office Action in Taiwanese Appln. No. 108107710, dated Jul. 19, 2022, 4 pages (with English search report).

Search Report in JP Appln. No. 2020-547186, dated Jan. 31, 2023, 33 pages.

FILTERING DURING IN-SITU MONITORING OF POLISHING

CROSS-REFERENCE TO RELATED APPLICATIONS

This application is a divisional of U.S. patent application Ser. No. 16/294,382, filed on Mar. 6, 2019, which claims priority to U.S. Provisional Patent Application Ser. No. 62/641,950, filed on Mar. 12, 2018, the disclosures of which are incorporated by reference.

TECHNICAL FIELD

This disclosure relates to using applying a filter to data acquired by an in-situ monitoring system to control polishing.

BACKGROUND

An integrated circuit is typically formed on a substrate by the sequential deposition of conductive, semiconductive, or insulative layers on a silicon wafer. One fabrication step involves depositing a filler layer over a non-planar surface and planarizing the filler layer. For certain applications, the filler layer is planarized until the top surface of a patterned layer is exposed. A conductive filler layer, for example, can be deposited on a patterned insulative layer to fill the trenches or holes in the insulative layer. After planarization, the portions of the metallic layer remaining between the raised pattern of the insulative layer form vias, plugs, and lines that provide conductive paths between thin film circuits on the substrate. For other applications, such as oxide polishing, the filler layer is planarized until a predetermined thickness is left over the non planar surface. In addition, planarization of the substrate surface is usually required for photolithography.

Chemical mechanical polishing (CMP) is one accepted method of planarization. This planarization method typically requires that the substrate be mounted on a carrier or polishing head. The exposed surface of the substrate is typically placed against a rotating polishing pad. The carrier head provides a controllable load on the substrate to push it against the polishing pad. An abrasive polishing slurry is typically supplied to the surface of the polishing pad.

One problem in CMP is determining whether the polishing process is complete, i.e., whether a substrate layer has been planarized to a desired flatness or thickness, or when a desired amount of material has been removed. Variations in the slurry distribution, the polishing pad condition, the relative speed between the polishing pad and the substrate, and the load on the substrate can cause variations in the material removal rate. These variations, as well as variations in the initial thickness of the substrate layer, cause variations in the time needed to reach the polishing endpoint. Therefore, the polishing endpoint usually cannot be determined merely as a function of polishing time.

In some systems, the substrate is monitored in-situ during polishing, e.g., by monitoring the torque required by a motor to rotate the platen or carrier head. However, existing monitoring techniques may not satisfy increasing demands of semiconductor device manufacturers.

SUMMARY

In one aspect, a method of controlling polishing includes polishing a substrate, monitoring the substrate during polishing with an in-situ monitoring system including generating a signal from a sensor, filtering the signal to generate a filtered signal, and determining at least one of a polishing endpoint or an adjustment for a polishing rate from the filtered signal. The signal includes a sequence of measured values, and the filtered signal including a sequence of adjusted values. The filtering includes modelling a plurality of periodic disturbances at a plurality of different frequencies using a plurality of disturbance states, modelling an underlying signal using a plant state, and applying a linear prediction filter to the plant state and the plurality of disturbance states to generate a filtered signal representing the underlying signal.

In another aspect, a computer program product includes a computer-readable medium having instructions, which, when executed by a processor, cause the processor to receive, during polishing of a substrate, a signal from an in-situ monitoring system, filter the signal to generate a filtered signal, and determine at least one of a polishing endpoint or an adjustment for a polishing rate from the filtered signal. The signal includes a sequence of measured values, and the filtered signal includes a sequence of adjusted values. The instructions to filter the signal include instructions to model a plurality of periodic disturbances at a plurality of different frequencies using a plurality of disturbance states, model an underlying signal using a plant state, and apply a linear prediction filter to the plant state and the plurality of disturbance states to generate a filtered signal representing the underlying signal.

In another aspect, a polishing system includes a platen to support a polishing pad, a carrier head to hold a substrate in contact with the polishing pad during polishing, an in-situ monitoring system configured to generate a signal from a sensor that monitors the substrate during polishing, and a controller. The controller is configured to receive the signal from the in-situ monitoring system during polishing of the substrate, filter the signal to generate a filtered signal, and determine at least one of a polishing endpoint or an adjustment for a polishing rate from the filtered signal. The signal includes a sequence of measured values, and the filtered signal including a sequence of adjusted values. The controller is configured to filter the signal by modeling a plurality of periodic disturbances at a plurality of different frequencies using a plurality of disturbance states, modeling an underlying signal using a plant state, and apply a linear prediction filter to the plant state and the plurality of disturbance states to generate a filtered signal representing the underlying signal.

Implementations may include one or more of the following features.

The plurality of periodic disturbances may be exactly two or exactly three periodic disturbances. The plurality of periodic disturbances may include a head sweep disturbance and/or platen rotation disturbance.

Filtering may include modelling the underlying signal using a plurality of plant states. The in-situ monitoring system may include a motor current monitoring system, and the plurality of plant states may include a filtered motor current and a motor current rate. The in-situ monitoring system may include a torque monitoring system, and the plurality of plant states may include a filtered torque and a torque rate.

The linear prediction filter may include a Kalman filter. The in-situ monitoring system may include a motor current monitoring system or motor torque monitoring system. The in-situ monitoring system may include a motor torque monitoring system.

Implementations can include one or more of the following potential advantages. Periodic disturbances in a signal can be reduced without introducing significant filter delay. Polishing can be halted more reliably at a target thickness.

The details of one or more embodiments are set forth in the accompanying drawings and the description below. Other aspects, features and advantages will be apparent from the description and drawings, and from the claims.

DESCRIPTION OF DRAWINGS

Like reference symbols in the various drawings indicate like elements.

DETAILED DESCRIPTION

In some semiconductor fabrication processes polishing, the process is monitored by an in-situ monitoring system. However, in some situations the signal from the in-situ monitoring system can be corrupted by periodic or sinusoidal disturbances. These disturbances can originate from a variety of sources, often associated with motion of the substrate. For example, in a polishing operation, such disturbances can originate from platen rotation or oscillating sweep of the carrier head. Sometimes higher harmonics are also present; this could be due to nonlinearities such as friction.

In general, for semiconductor processing, it is desirable to extract a signal from the in-situ monitoring system that can be used for end point control. Current techniques to remove periodic or sinusoidal disturbances that involve low pass filtering of the signal can result in additional delay, which can impact accuracy of the endpoint. However, a technique that involves filtering out the sinusoids (sinusoidal rejection), using a model-based approach, can result in minimal delay or signal distortion.

As an example, the torque or current required by a motor to cause the platen or carrier head to rotate at a specified rotation rate can be monitored. This motor torque is a noisy signal that can be subject to the periodic disturbances. For example, the motor torque and motor current signal-versus-time curves can be corrupted not only by random noise, but also by a large systematic, sinusoidal disturbance due to sweeping of the carrier head 140 across the polishing pad. The filtering approach can be applied to such a signal.

When an underlying layer is exposed, assuming the underlying layer has a different coefficient of friction against the polishing layer than the overlying layer, the polishing endpoint can be determined by detecting the resulting change in motor torque. For example, in some semiconductor chip fabrication processes an overlying layer, e.g., silicon oxide or polysilicon, is polished until an underlying layer, e.g., a dielectric, such as silicon oxide, silicon nitride or a high-K dielectric, is exposed.

Figure 1:
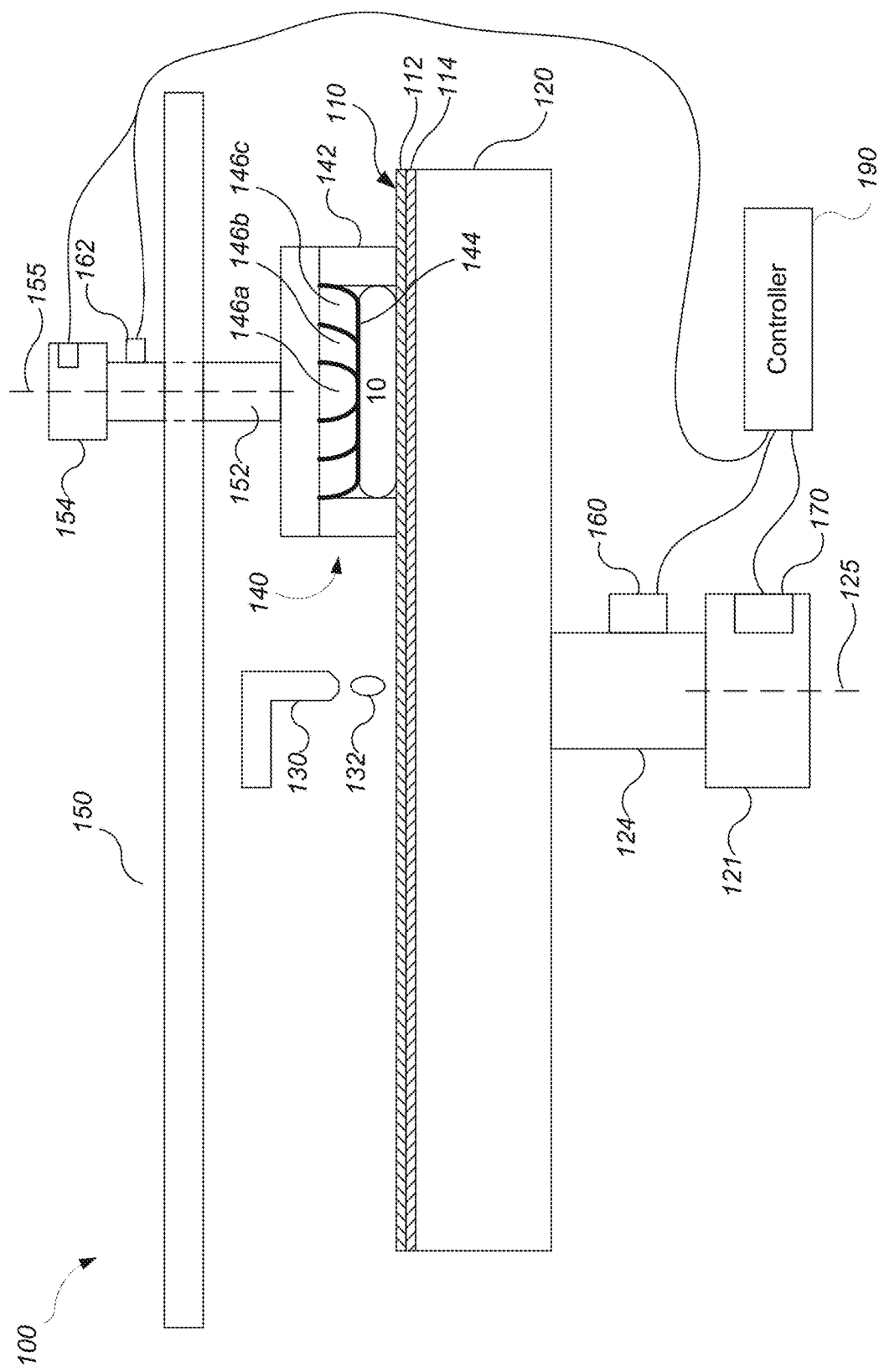
FIG. 1 illustrates a schematic cross-sectional view of an example of a polishing apparatus.

FIG. 1 illustrates an example of a polishing apparatus 100. The polishing apparatus 100 includes a rotatable disk-shaped platen 120 on which a polishing pad 110 is situated. The polishing pad 110 can be a two-layer polishing pad with an outer polishing layer 112 and a softer backing layer 114. The platen is operable to rotate about an axis 125. For example, a motor 121, e.g., a DC induction motor, can turn a drive shaft 124 to rotate the platen 120.

The polishing apparatus 100 can include a port 130 to dispense polishing liquid 132, such as abrasive slurry, onto the polishing pad 110 to the pad. The polishing apparatus can also include a polishing pad conditioner to abrade the polishing pad 110 to maintain the polishing pad 110 in a consistent abrasive state.

The polishing apparatus 100 includes at least one carrier head 140. The carrier head 140 is operable to hold a substrate 10 against the polishing pad 110. Each carrier head 140 can have independent control of the polishing parameters, for example pressure, associated with each respective substrate.

The carrier head 140 can include a retaining ring 142 to retain the substrate 10 below a flexible membrane 144. The carrier head 140 also includes one or more independently controllable pressurizable chambers defined by the membrane, e.g., three chambers 146a-146c, which can apply independently controllable pressurizes to associated zones on the flexible membrane 144 and thus on the substrate 10 (see FIG. 1). Although only three chambers are illustrated in FIG. 1 for ease of illustration, there could be one or two chambers, or four or more chambers, e.g., five chambers.

The carrier head 140 is suspended from a support structure 150, e.g., a carousel, and is connected by a drive shaft 152 to a carrier head rotation motor 154, e.g., a DC induction motor, so that the carrier head can rotate about an axis 155. Optionally each carrier head 140 can oscillate laterally, e.g., on sliders on the carousel 150, or by rotational oscillation of the carousel itself. In typical operation, the platen is rotated about its central axis 125, and each carrier head is rotated about its central axis 155 and translated laterally across the top surface of the polishing pad.

While only one carrier head 140 is shown, more carrier heads can be provided to hold additional substrates so that the surface area of polishing pad 110 may be used efficiently. Thus, the number of carrier head assemblies adapted to hold substrates for a simultaneous polishing process can be based, at least in part, on the surface area of the polishing pad 110.

A controller 190, such as a programmable computer, is connected to the motors 121, 154 to control the rotation rate of the platen 120 and carrier head 140. For example, each motor can include an encoder that measures the rotation rate of the associated drive shaft. A feedback control circuit, which could be in the motor itself, part of the controller, or a separate circuit, receives the measured rotation rate from the encoder and adjusts the current supplied to the motor to ensure that the rotation rate of the drive shaft matches at a rotation rate received from the controller.

The polishing apparatus also includes an in-situ monitoring system 160, e.g., a motor current or motor torque monitoring system, which can be used to determine a polishing endpoint. The in-situ monitoring system 160 includes a sensor to measure a motor torque and/or a current supplied to a motor.

For example, a torque meter 160 can be placed on the drive shaft 124 and/or a torque meter 162 can be placed on the drive shaft 152. The output signal of the torque meter 160 and/or 162 is directed to the controller 190.

Alternatively or in addition, a current sensor 170 can monitor the current supplied to the motor 121 and/or a current sensor 172 can monitor the current supplied to the motor 154. The output signal of the current sensor 170 and/or 172 is directed to the controller 190. Although the current sensor is illustrated as part of the motor, the current sensor could be part of the controller (if the controller itself outputs the drive current for the motors) or a separate circuit.

The output of the sensor can be a digital electronic signal (if the output of the sensor is an analog signal then it can be converted to a digital signal by an ADC in the sensor or the controller). The digital signal is composed of a sequence of signal values, with the time period between signal values depending on the sampling frequency of the sensor. This sequence of signal values can be referred to as a signal-versus-time curve. The sequence of signal values can be expressed as a set of values $x_n$.

As noted above, the "raw" digital signal from the sensor can be smoothed using a filter.

Figure 2:
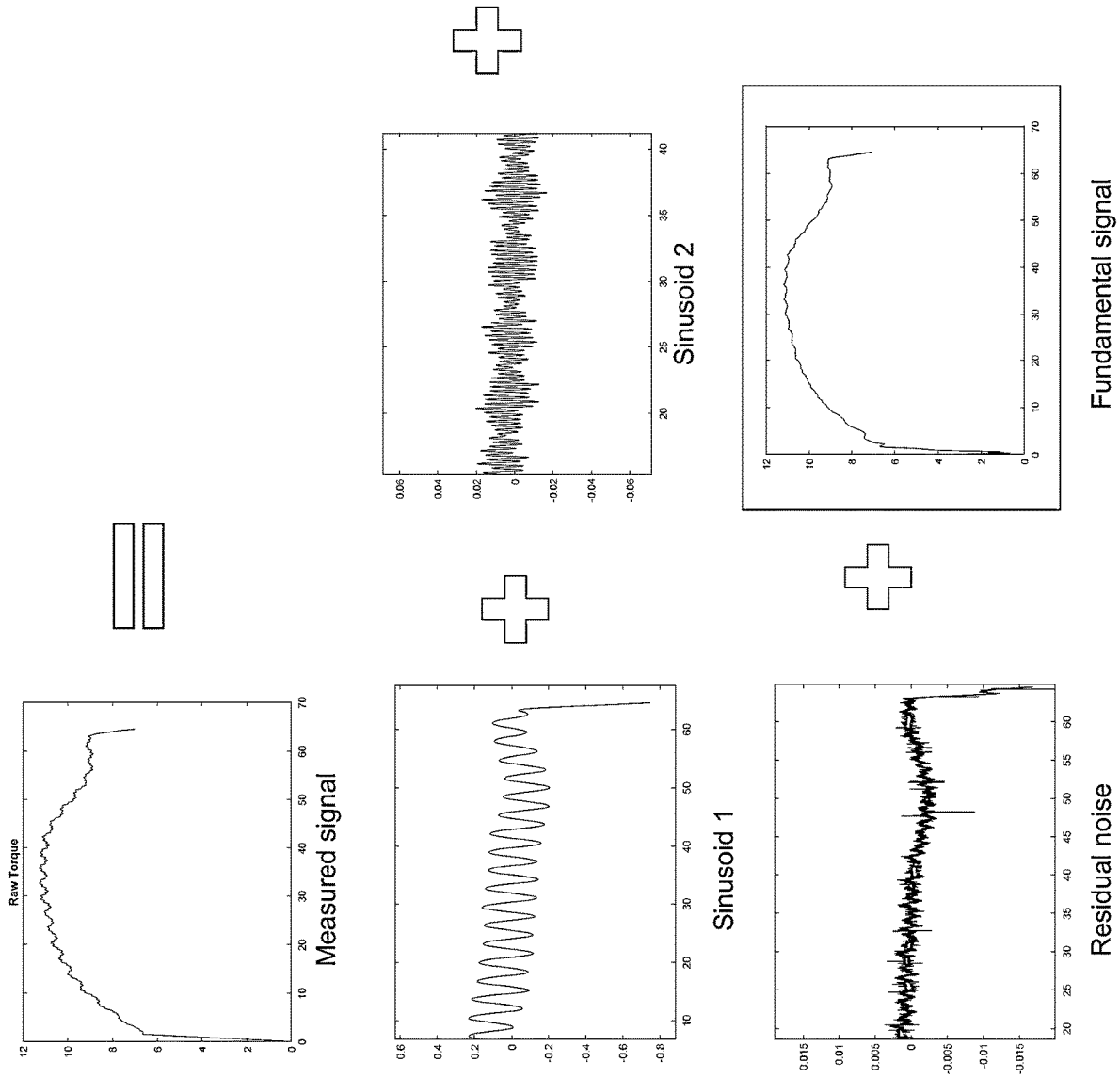
FIG. 2 is schematic illustrating decomposition of a signal into components.

As shown in FIG. 2, the measured "raw" signal can be decomposed in the time domain into multiple signals. In particular, the measured signal can be decomposed into multiple sinusoid components, a white noise component, and a fundamental signal.

To asymptotically reject a deterministic disturbance, a model of the disturbance can be embedded in the "plant" model for the signal (e.g.,. an Internal Model Principle). The model of the disturbance can used for sinusoidal disturbance rejection, although other disturbances can be modeled.

For the purpose of monitoring a CMP operation, a "plant" model of the CMP system captures the rotational dynamics with friction (MT or Interface). In contrast, an augmented model includes the "plant" states for the plant model, plus the disturbance states of a disturbance model. To perform the filtering, an appropriate Kalman filter can be run on the augmented model using the raw measured signal.

A set of n sinusoids can be modeled as $$\sum_{m=1}^{n} A_m \sin(\omega_m t + \varphi_m)$$

The dominant frequencies for attenuation can be obtained through experimentation and offline analysis using a Fast Fourier Transform (FFT). Consequently, $\omega_m$ is known for multiple values of m=1 to n, where n sinusoidal disturbances are being modeled.

The states for a single sinusoid with known frequency $\omega\_1$ can be defined as follows:

$$X_{d\_k} = \begin{bmatrix} A_m \sin(\omega_1 t + \varphi) \\ A_m \cos(\omega_1 t + \varphi) \end{bmatrix} = \begin{bmatrix} X_{1d} \\ X_{2d} \end{bmatrix}_k$$

Assuming the sampling period is Ts, the (k+1)th sample is (e.g., using $\sin(\propto+\beta)$ expansion):

$$X_{d\_k+1} = \begin{bmatrix} A_m \sin(\omega_1 \{t + T_s\} + \varphi) \\ A_m \cos(\omega_1 \{t + T_s\} + \varphi) \end{bmatrix} =$$

$$\begin{bmatrix} X_{1d} \\ X_{2d} \end{bmatrix}_{k+1} = \begin{bmatrix} \cos(\omega_1 T_s) & \sin(\omega_1 T_s) \\ -\sin(\omega_1 T_s) & \cos(\omega_1 T_s) \end{bmatrix} \begin{bmatrix} A_m \sin(\omega_1 t + \varphi) \\ A_m \cos(\omega_1 t + \varphi) \end{bmatrix}$$

Thus, $$X_{d\_k+1} = \begin{bmatrix} \cos(\omega_1 T_s) & \sin(\omega_1 T_s) \\ -\sin(\omega_1 T_s) & \cos(\omega_1 T_s) \end{bmatrix} \begin{bmatrix} X_{1d} \\ X_{2d} \end{bmatrix}_k = A_d * X_{d\_k}$$

If multiple sinusoids are present, then an A-matrix for multiple sinusoids (e.g., n sinusoids), can be generated in block diagonal format as follows:

$$X_{d\_k+1} = \begin{bmatrix} A_1 & \cdots & 0 \\ \vdots & \ddots & \vdots \\ 0 & \cdots & A_n \end{bmatrix} \begin{bmatrix} X_{1d\_k} \\ \vdots \\ X_{nd\_k} \end{bmatrix}_k = A_d * X_{d\_k}$$

with each sinusoid having two 2 states as shown above. In addition, the model is still linear. With this approach, it is not necessary to estimate the phase and amplitude separately.

However, if the frequency is unknown, the frequency can be another state of the model. In this case, the model becomes nonlinear (and an Extended Kalman Filter may be needed).

Turning now to the plant model, two plant states can be denoted as follows:

$$X_{P\_k} = \begin{bmatrix} Filtered\ Torque \\ Torque\ Rate \end{bmatrix}_k = \begin{bmatrix} T \\ T\_R \end{bmatrix}_k$$

The Filtered Torque will be the fundamental signal we are seeking (in which disturbances have been reduced or removed).

The model can be expressed as follows $$\bullet X_{P\_k+1} = \begin{bmatrix} 1 & T_s \\ 0 & 1 \end{bmatrix} X_{P\_k} + \underbrace{\begin{bmatrix} \omega_1 \\ \omega_2 \end{bmatrix}_k}_{White\ noise} = A_p * X_{P\_k} + W_k \text{ with}$$

$$T_{k+1} = T_k + T\_R_k + \omega_{1\_k}$$

$$T\_R_{k+1} = T\_R_k + \omega_{2\_k}$$

Alternatively, a single plant stated can be denoted as follows:

$$X_{p\_k} = [Filtered\ Torque]_k = T_k$$

In this case $$X_{p\_k+1} = T_{k+1} = T_k + \omega_{1k}$$

An augmented state can be defined as follows:

$$X_{a\_k} = \begin{bmatrix} X_{d\_k} & X_{p\_k} \end{bmatrix}^T$$

The augmented model with augmented dynamics and measured torque output equations can be expressed as:

$$\begin{bmatrix} X_d \\ X_p \end{bmatrix}_{k+1} = \begin{bmatrix} & & 0 \\ & \vdots & \\ & & A_p \end{bmatrix} \begin{bmatrix} X_d \\ X_p \end{bmatrix}_k + \begin{bmatrix} \omega_d \\ \vdots \\ \omega_p \end{bmatrix}$$

$$y = \begin{bmatrix} 1 & 0 & \cdots & 1 & 0 & 1 & 0 \end{bmatrix} \begin{bmatrix} X_d \\ X_p \end{bmatrix}_k$$

Conventional Kalman filters are described in "An Introduction to the Kalman Filter" by Welch and Bishop. A standard Kalman filter (specifically, a "discrete Kalman filter (DKF)") has smoothing capabilities because the noise characteristics of the system being filtered are included in the formulas. A standard Kalman filter also employs a predictive step that estimates a future data value based on current and past data. The predictive step usually only extends into the future by one data step (i.e. near-term prediction).

Figure 3:
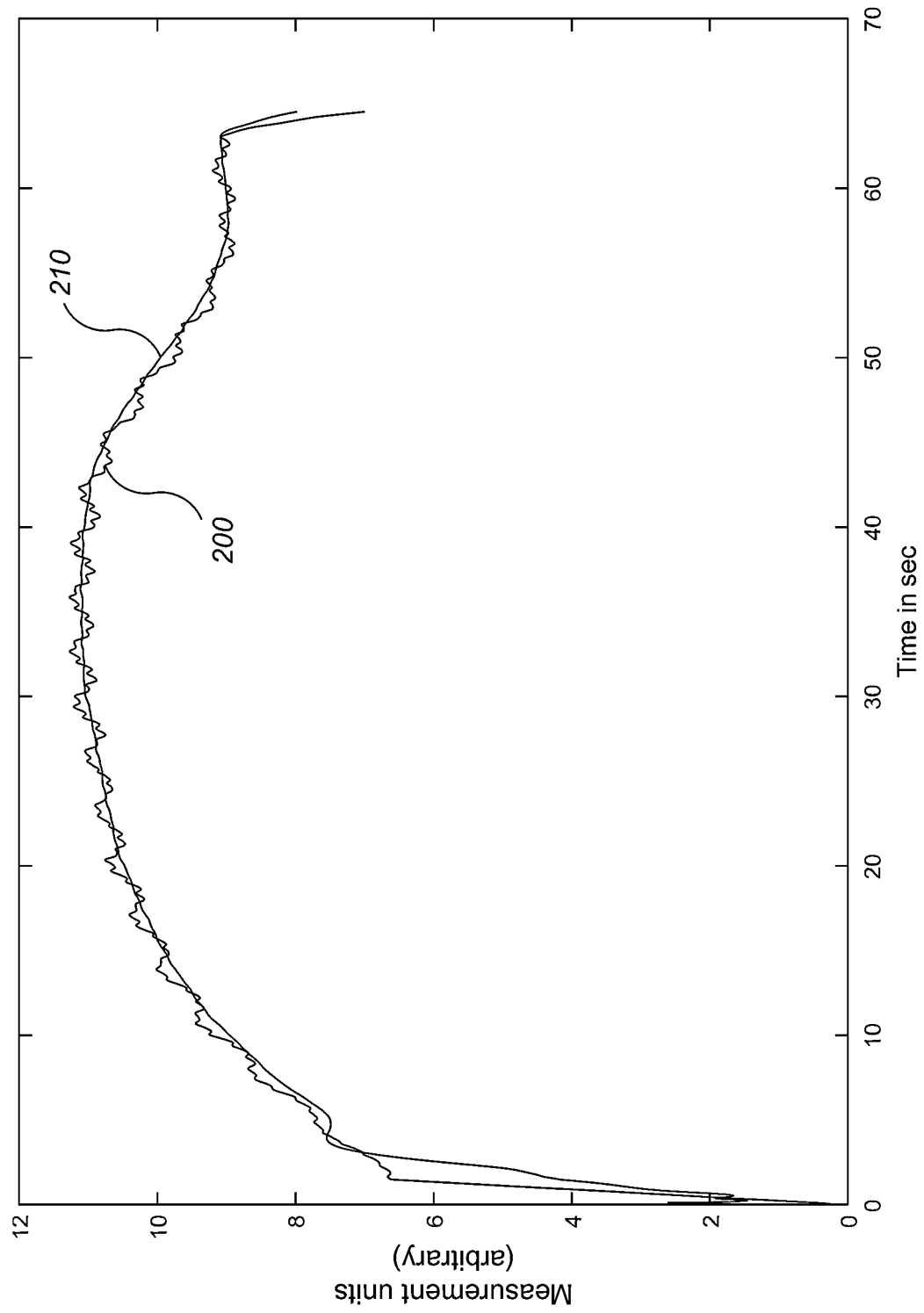
FIG. 3 is a graph comparing the raw motor torque trace and filtered platen torque trace generated by a customized filter.

FIG. 3 illustrates a graph of both the "raw" platen torque signal 200, and a filtered signal 210 generated by applying a filter that uses a model having three sinusoidal disturbances and one torque state. The filtered signal is relatively clean, and does not suffer from significant delay.

Implementations and all of the functional operations described in this specification can be implemented in digital electronic circuitry, or in computer software, firmware, or hardware, including the structural means disclosed in this specification and structural equivalents thereof, or in combinations of them. Implementations described herein can be implemented as one or more non-transitory computer program products, i.e., one or more computer programs tangibly embodied in a machine readable storage device, for execution by, or to control the operation of, data processing apparatus, e.g., a programmable processor, a computer, or multiple processors or computers.

A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. Processors suitable for the execution of a computer program include, by way of example, both general and special purpose microprocessors, and any one or more processors of any kind of digital computer.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The above described polishing apparatus and methods can be applied in a variety of polishing systems. Either the polishing pad, or the carrier head, or both can move to provide relative motion between the polishing surface and the wafer. For example, the platen may orbit rather than rotate. The polishing pad can be a circular (or some other shape) pad secured to the platen. Some aspects of the endpoint detection system may be applicable to linear polishing systems (e.g., where the polishing pad is a continuous or a reel-to-reel belt that moves linearly). The polishing layer can be a standard (for example, polyurethane with or without fillers) polishing material, a soft material, or a fixed-abrasive material. Terms of relative positioning are used; it should be understood that the polishing surface and wafer can be held in a vertical orientation or some other orientations.

While this specification contains many specifics, these should not be construed as limitations on the scope of what may be claimed, but rather as descriptions of features that may be specific to particular embodiments of particular inventions. In some implementations, the method could be applied to other combinations of overlying and underlying materials, and to signals from other sorts of in-situ monitoring systems, e.g., optical monitoring or eddy current monitoring systems.

What is claimed is:

1. A method of controlling polishing, comprising:
   polishing a substrate in a polishing system;
   during polishing monitoring the substrate with an in-situ monitoring system, the monitoring including generating a signal from a sensor, the signal including a sequence of measured values;
   filtering the signal to generate a filtered signal, the filtered signal including a sequence of adjusted values, the filtering including
      modelling a plurality of periodic disturbances, using a plurality of disturbance states, at a plurality of different frequencies,
      modelling an underlying signal, using a plant state, and
      applying a linear prediction filter to the plant state and the plurality of disturbance states to generate the filtered signal representing the underlying signal; and
   causing the polishing system to at least one of halt polishing of the substrate or adjust a polishing rate of the substrate based on the filtered signal.

2. The method of claim 1, wherein the plurality of periodic disturbances include a head sweep disturbance and/or platen rotation disturbance.

3. The method of claim 1, wherein the filtering includes modelling the underlying signal using a plurality of plant states.

4. The method of claim 3, wherein the in-situ monitoring system comprises a motor current monitoring system, and the plurality of plant states include a filtered motor current and a motor current rate.

5. The method of claim 3, wherein the in-situ monitoring system comprises a torque monitoring system, and the plurality of plant states include a filtered torque and a torque rate.

6. A polishing system, comprising:
   a platen to support a polishing pad;
   a carrier head to hold a substrate in contact with the polishing pad during polishing;

an in-situ monitoring system configured to generate a signal from a sensor that monitors the substrate during polishing, the signal including a sequence of measured values; and a controller configured to
receive, during polishing of the substrate, the signal from the in-situ monitoring system,
filter the signal to generate a filtered signal, the filtered signal including a sequence of adjusted values, wherein the controller is configured to filter the signal by
modeling a plurality of periodic disturbances, using a plurality of disturbance states, at a plurality of different frequencies,
modeling an underlying signal, using a plant state, and
applying a linear prediction filter to the plant state and the plurality of disturbance states to generate the filtered signal representing the underlying signal, and
at least one of halt polishing or adjust a polishing rate based on the filtered signal.

7. The system of claim 6, wherein the in-situ monitoring system comprises a motor current monitoring system or motor torque monitoring system.

8. The system of claim 7, wherein the in-situ monitoring system comprises a motor current monitoring system, and wherein a plurality of plant states for modeling the underlying signal include a filtered motor current and a motor current rate.

9. The system of claim 7, wherein the in-situ monitoring system comprises a motor torque monitoring system, and a plurality of plant states for modeling the underlying signal include a filtered torque and a torque rate.

10. The system of claim 7, wherein the in-situ monitoring system comprises a platen motor current monitoring system, a platen motor torque monitoring system, a carrier head motor current monitoring system, or a carrier head motor torque monitoring system.

11. The system of claim 6, wherein the linear prediction filter comprises a Kalman filter.

12. The system of claim 6, wherein the plurality of periodic disturbances consists of two periodic disturbances.

13. The system of claim 6, wherein the plurality of periodic disturbances consists of three periodic disturbances.

14. The system of claim 6, wherein the plurality of periodic disturbances include a head sweep disturbance.

15. The system of claim 6, wherein the plurality of periodic disturbances include a platen rotation disturbance.

16. The system of claim 6, wherein the controller is configured to filter the signal by modeling the underlying signal using a plurality of plant states.

17. The system of claim 16, wherein the plurality of plant states include a filtered motor current and a motor current rate.

18. The system of claim 16, wherein the plurality of plant states include a filtered torque and a torque rate.

19. The system of claim 6, wherein the controller is configured to model the plurality of periodic disturbances by modeling the plurality of periodic disturbances as a plurality of sinusoids.

20. The system of claim 6, wherein the plurality of different frequencies are preset values.

21. The system of claim 6, wherein a frequency of the plurality of different frequencies is a variable in a model used for modeling the plurality of periodic disturbance.

* * * * *